(12) United States Patent
Van Dijk et al.

(10) Patent No.: US 9,781,941 B2
(45) Date of Patent: Oct. 10, 2017

(54) STABLE MILDLY ACIDIC ALCOHOLIC MILK-AND/OR SOY PROTEIN-BASED DRINK

(75) Inventors: Johannes Henricus Van Dijk, Odiliapeel (NL); Pauline Elisabeth Antoinette Smulders, Zoelen (NL)

(73) Assignee: FrieslandCampina Nederland Holding B.V., Amersfoort (NL)

( * ) Notice: Subject to any disclaimer, the term of this patent is extended or adjusted under 35 U.S.C. 154(b) by 856 days.

(21) Appl. No.: 13/413,500

(22) Filed: Mar. 6, 2012

(65) Prior Publication Data
US 2012/0251687 A1  Oct. 4, 2012

Related U.S. Application Data

(63) Continuation of application No. 11/587,233, filed as application No. PCT/NL2005/000302 on Apr. 22, 2005, now abandoned.

(30) Foreign Application Priority Data

Apr. 22, 2004  (NL) ..................................... 1026007

(51) Int. Cl.
| | | |
|---|---|---|
| *A23C 9/154* | (2006.01) | |
| *C12G 3/04* | (2006.01) | |
| *A23C 9/152* | (2006.01) | |

(52) U.S. Cl.
CPC .............. *A23C 9/1526* (2013.01); *C12G 3/04* (2013.01)

(58) Field of Classification Search
CPC ................................ A23C 9/1526; C12G 3/04
USPC ........ 426/592, 593, 599, 654, 575, 573, 584
See application file for complete search history.

(56) References Cited

U.S. PATENT DOCUMENTS

| | | | | |
|---|---|---|---|---|
| 5,342,643 A | * | 8/1994 | Wolf et al. | ..................... 426/590 |
| 5,478,591 A | * | 12/1995 | Bevers et al. | ................. 426/592 |

FOREIGN PATENT DOCUMENTS

| | | | |
|---|---|---|---|
| CA | 2316004 | * | 2/2001 |
| EP | 67592 A2 | * | 12/1982 |
| EP | 177077 A1 | * | 4/1986 |

* cited by examiner

*Primary Examiner* — Vera Stulii
(74) *Attorney, Agent, or Firm* — Gilberto M. Villacorta; Sunit Talapatra; Foley & Lardner LLP

(57) ABSTRACT

The present invention relates to a stable alcoholic milk and/or soy protein-based drink with a pH ranging from 5.2-6.5 comprising at least one or more milk and/or soy proteins, alcohol and one or more stabilizers. The invention also relates to a method for preparing the drinks, comprising at least one or more milk and/or soy proteins, which method comprises: a) mixing at least a portion of the milk and/or soy proteins and at least a portion of the stabilizers in an aqueous medium to obtain a mixture; b) setting the pH of the mixture to 3.5-4.4; c) homogenizing the mixture obtained in step b) to obtain a homogenate; d) setting the pH of the homogenate to 5.2-6.5; and e) mixing in the alcohol and optionally a residual portion of the milk and/or soy proteins and of the stabilizers during or after one or more of steps a)-d).

21 Claims, No Drawings

STABLE MILDLY ACIDIC ALCOHOLIC MILK-AND/OR SOY PROTEIN-BASED DRINK

This application is a Continuation of U.S. patent application Ser. No. 11/587,233, filed Aug. 7, 2007, which is a National Stage of PCT/NL2005/000302, filed Apr. 22, 2005, and which claims priority to Netherlands Patent Application No. 1026007, filed Apr. 22, 2004, the contents of which are incorporated herein by reference in their entirety.

The present invention relates to an alcoholic milk and/or soy protein-based drink with a pH in the range from 5.2-6.5, preferably 5.2-6.2, and to a method for preparing such drink.

Alcoholic milk and/or soy protein-based drinks have long been known in the specialist field. These drinks are often prepared by combining a milk and/or soy product, such as for example milk or milk and cream, with alcohol. To impart a defined flavour to these alcoholic milk and/or soy protein-based drinks, flavourings, such as for example fruit flavours, etc., are also added.

These drinks often have a pH of lower than approximately 5. These drinks with a pH of lower than approximately 5 have been found to have too sharp an acid impression with certain flavours or combinations of flavourings, i.e. to be too acidic, and consequently the acid impression is too strong. The flavours or combinations of flavourings are not done justice to. It has now been found that an optimum taste sensation is obtained for many flavours if the pH of such drinks is in the range from 5.2-6.5, preferably 5.2-6.2. The natural pH of milk products and soy products is in the neutral range. Milk and soy proteins, in particular in the presence of alcohol, are unstable at a pH of lower than 6.5. Consequently, when the pH is lowered to these levels, stabilizers are added to alcohol-containing milk and/or soy protein-based products in order to prevent agglomeration and/or segregation of the proteins.

In general, alcoholic milk and/or soy protein-based drinks are prepared by combining the constituents of milk and/or soy proteins, sugar, alcohol and preferably also cream (in the case of cream liqueur) in an aqueous medium and homogenizing the mixture formed in this way. Then, flavours and optionally colorings are added to the homogenate. When preparing drinks with a pH in the acidic range (<approximately 5), the mixture of constituents is brought to a pH of around 4 prior to homogenization. In this case, at least one stabilizer also has to be added in order to prevent agglomeration. and/or segregation of the milk and/or soy proteins and to thus obtain a stable drink.

Good stabilizer systems have already been identified for the above drinks with a pH in the acidic range (pH<approximately 5) and in the neutral range (pH>6.5). However, in the case of a pH in the range from 5.2-6.5, preferably 5.2-6.2, the above preparation method results in a drink which is insufficiently stable, even in the presence of known stabilizers which function well at an acidic and neutral pH. This pH range is of particular interest since very well-known and desired flavours and combinations of flavourings, such as coffee flavour and certain fruit flavours, such as for example the flavour of strawberry, pear, melon, apple or banana, have an optimum mildly acidic taste sensation in this pH range. Hitherto, there has been no knowledge of an alcoholic milk and/or soy protein-based drink, preferably a cream liqueur, with a pH in the range from 5.2 to 6.5, preferably from 5.2 to 6.2, which is stable for a prolonged period of time.

Therefore, it is an object of the present invention to provide a stable alcoholic milk and/or soy protein-based drink, preferably a cream liqueur, with a pH in the range from 5.2 to 6.5, preferably from 5.2 to 6.2, such that this drink has a mildly acidic flavour which imparts a particularly good taste sensation, in particular in combination with certain flavours. Furthermore, it is an object of the present invention to provide a method which can be used to obtain such stable alcoholic milk and/or soy protein-based drink, preferably a cream liqueur, with a pH in the range from 5.2 to 6.5, preferably from 5.2 to 6.2.

Thus, the invention relates to a stable alcoholic milk and/or soy protein-based drink with a pH in the range from 5.2 to 6.2, comprising at least one or more milk and/or soy proteins, alcohol and one or more stabilizers.

The drink according to the invention has a pH in the range from 5.2 to 6.5, preferably of 5.2-6.2, more preferably of 5.2-6.0, and most preferably from 5.4-6.0. In particular in the latter ranges, there has hitherto been a lack of well-stabilized systems which are stable for a prolonged period of time. It should be noted that a range from 5.2-6.5 refers to a range from 5.2 to 6.5 which preferably includes the limit values of 5.2 and 6.5.

The above drink has a D(3,2) (volume-surface average particle size distribution) of less than 2.0 microns, preferably less than 1.5 microns, most preferably less than 1.2 microns. The D(3,2) is preferably measured on a Coulter LS230 at a temperature of 20° C. and neutral pH, using tap water as dispersant.

The term "stable drink", as used in the context of the present application, refers to a drink which exhibits substantially no agglomeration or segregation when stored at room temperature, i.e. at a temperature in the range from 15-25° C., for at least 2 months, preferably at least 6 months, more preferably at least 9 months and most preferably at least 12 months. However, although this is less preferred, a small layer of cream or fat may appear on the liquid during storage, but in this case this layer can easily be dispersed again through the drink by simply shaking the drink container. The drink is also stable if the D(3,2) the said storage time does not deviate substantially from the D(3,2) just after homogenization and is still less than 2.0 microns, preferably less than 1.5 microns, most preferably less than 1.2 microns.

The term "milk and/or soy protein-based" as used in the context of the present application means that the drink comprises milk and/or soy protein as an important constituent, preferably in a quantity of at least 0.2 percent by weight (% by weight), more preferably at least 0.5% by weight, even more preferably at least 0.6% by weight.

As used herein, the term "percent by weight" or "% by weight" refers to the proportion by weight which a constituent forms of the total weight of all the constituents. It is also possible for other proteins to be used instead of or in addition to milk and/or soy protein, such as egg proteins, potato proteins, pea proteins and wheat proteins. However, drinks according to the invention based on milk and/or soy proteins are preferred.

The term "milk protein" as used in the context of the present application refers to any type of milk protein, such as for example casein, caseinate (sodium, potassium, calcium, magnesium caseinate or mixtures thereof), whey protein, and the like, or mixture of milk proteins, such as for example a mixture of casein, caseinate and whey protein. The milk proteins are preferably derived from a dairy source which simultaneously also provides an aqueous medium, such as for example milk, skimmed milk, concentrated milk, fermented milk or milk which has been subjected to ultra-filtration, but can also be provided in the form of a dairy powder preparation, such as for example milk powder, skimmed milk powder, milk powder concentrate, whey powder concentrate, whey protein concentrate or isolate, or combinations thereof, which can be provided in an aqueous medium.

Alternatively, it is possible to use casein or caseinate preparations as source of the one or more milk proteins, optionally in combination with a dairy source as described above. In the case of a dairy powder preparation, it is preferred to use a preparation which comprises the total milk protein combination. Likewise in the case of a dairy source which at the same time also provides an aqueous medium, it is preferred to use a source which comprises the total milk protein combination.

The drink may also be based on soy protein or on a combination of milk protein and soy protein. Examples of sources of soy protein are commercially available soy concentrates (with a protein content of 20-85% by weight) and soy isolates (with a protein content of greater than 85% by weight; both available from ADM, US).

Another important constituent of the stable alcoholic milk and/or soy protein-based drink is potable alcohol. The alcohol can be provided in pure form, in the form of any aqueous solution, but also in the form of an aqueous solution which has already been flavoured, for example wines or spirits, such as for example whisky, rum, liqueurs and the like, or any combination of one or more thereof.

At a pH lower than 6.5, also in the presence of alcohol, milk and/or soy proteins are destabilized such that they exhibit agglomeration and/or segregation. To prevent this, it is very important that one or more stabilizers be present. The stabilizer(s) used may be any stabilizers which are known in the specialist field for foods, such as for example pectin, alkylene glycol alginates, such as propylene glycol alginate, carboxymethyl cellulose, locust bean gum, glycoproteins (both natural glycoproteins, such as for example gum Arabic or fenugreek gum, and synthetically prepared glycoproteins produced by reaction of protein with carbohydrates), modified starch, sucrose esters, carrageenan, guar gum, sodium stearoyl lactylate (SSL), xanthan gum, gellan gum, chitosan or mixtures of two or more thereof.

Preferably the drink has a D(3,2) of less than 2.0 microns, preferably less than 1.5 microns, more preferably less than 1.2 microns, since it has been found that these particle size distributions give an attractive stability.

In a preferred embodiment, the drink exhibits substantially no agglomeration or segregation when stored at room temperature, i.e. at a temperature in the range from 15 to 25° C., for at least months, preferably at least 6 months, more preferably at least 9 months, and most preferably at least 12 months. The term "substantially no agglomeration or segregation" is also to be understood as encompassing the possibility of a small layer of cream or fat appearing on the liquid, but this small layer can easily be dispersed through the drink by simply shaking the drink container; this possibility is in any case less preferred. The drink is then still stable. It is also the case that the drink is stable if the D(3,2) after the said storage time does not deviate substantially from the D(3,2) value just after homogenization and is still less than 2.0 microns, preferably less than 1.5 microns, most preferably less than 1.2 microns.

In a preferred embodiment, the drink comprises less than 0.05 g/kg of lactate and less than 0.05 g/kg of polyphosphate, since these components are not required for better stabilization or flavour.

In another preferred embodiment, the drink also comprises one or more fats. These fats may be any fats which are acceptable for food use, such as for example cream, butter fat, and vegetable oil/fats, such as coconut oil, MCT oil and soy oil. The fat content is preferably at most 10% by weight, based on the total weight of the constituents.

It is preferred that the one or more fats are at least partially derived from cream, since this produces a very creamy alcoholic cream liqueur with an extraordinarily good flavour.

In yet another preferred embodiment, the drink also comprises one or more sweeteners in order to impart a slightly sweet flavour to the drink. Non-limiting examples of sweeteners of this type include sucrose, glucose, glucose syrup, lactose, hydrolysed lactose mixtures (glucose and galactose), sugar substitutes, such as for example aspartame, sucralose, Acesulfam K, sorbitol, and combinations thereof.

As has already been stated above, the one or more stabilizers can be selected from any stabilizers which are customary for foods, such as pectin, alkylene glycol alginates, such as propylene glycol alginate, carboxymethyl cellulose, locust bean gum, glycoproteins (both natural glycoproteins, such as for example gum Arabic or fenugreek gum, and synthetically prepared glycoproteins produced by reaction of protein with carbohydrates), modified starch, sucrose esters, carrageenan, guar gum, sodium stearoyl lactylate (SSL), xanthan gum, gellan gum and chitosan. The person skilled in this specialist field is aware of ways to determine the appropriate quantity of stabilizer.

In another preferred embodiment, the one or more stabilizers are selected from the group consisting of pectin, alkylene glycol alginates, such as propylene glycol alginate, carboxymethyl cellulose, locust bean gum and glycoproteins. It has been found that particularly stable drinks are obtained if these stabilizers are used.

It is preferred that the one or more stabilizers comprise at least alkylene glycol alginates, since these stabilizers have a better effect in the pH range of around 5.7.

More preferably, the one or more stabilizers at least comprise propylene glycol alginate, since this stabilizer has by far the best action in the pH range in question. The propylene glycol alginate is added in a suitable quantity to stabilize the drink either alone or in combination with one or more further stabilizers.

In yet another preferred embodiment, the drink comprises at least 0.5-10% by weight of one or more milk and/or soy proteins, at least 10% by weight of one or more fats, 0.5-40% by volume of alcohol, and 0.05-10 g/L of one or more stabilizers. It has been found that a drink prepared using these constituents has a particularly good taste sensation.

It is preferred that flavours, such as coffee flavour or certain fruit flavours, are added to the drink. As used in the context of the present application, the term "flavour" encompasses all flavouring compositions, flavours and extracts which can be added to foods in order to impart a defined taste. These flavours are very well known in this specialist field and include, for example, flavours which give the following taste perceptions: yellow fruits (including banana, apricot, pineapple), red fruits (including strawberry, raspberry, fruits of the forest), green fruits (including lemon, apple, pear, grape, melon), tropical fruits (including mango, coconut, lychee, guava, pomegranate), brown flavours (including coffee, chocolate, cognac, beer, caramel, honey), dairy flavours (including yoghurt, soft cheese, buttermilk), alcohol flavours, liqueurs and distillates (including beer, wine, cointreau, tequila, rum).

The drink may also comprise additional constituents, such as for example colorings, caramel, thickeners, flavourings, etc.

Surprisingly, it has been discovered that the above stable alcoholic drink can be obtained by firstly bringing the mixture of ingredients to a pH of 3.5-4.5 and homogenizing it, after which the pH of the homogenate is set to a pH from 5.2-6.5, preferably from 5.2-6.2.

Thus a drink can be obtained which is stable for a prolonged period of time.

In a further aspect, the invention thus relates to a method for preparing a stable alcoholic milk and/or soy protein-based drink with a pH in the range from 5.2-6.5, preferably 5.2-6.2, comprising as constituents at least one or more milk and/or soy proteins, alcohol and one or more stabilizers, which method comprises the following steps:
  a) mixing at least a portion of the milk and/or soy proteins and at least a portion of the stabilizers in an aqueous medium to obtain a mixture;
  b) setting the pH of the mixture to 3.5-4.5;
  c) homogenizing the mixture obtained in step b) to obtain a homogenate;
  d) setting the pH of the homogenate to 5.2-6.5, preferably 5.2-6.2;
  e) mixing in the alcohol and optionally a residual portion of the milk and/or soy proteins and of the stabilizers during or after one or more of steps a)-d).

It has been found that a drink obtained in this way has a considerably better mildly acidic taste for many flavours than comparable drinks which contain these flavours and have a pH of lower than approximately 5 or higher than approximately 6.5. The thus obtained drink also has a considerably greater stability compared to drinks obtained by simply homogenizing the constituents at a pH in the range from 5.2-6.5 without a first homogenization at an acidic pH.

The method for preparing the stable alcoholic milk and/or soy protein-based drink comprises, as step a), the mixing of at least a portion of the milk and/or soy proteins and at least a portion of the stabilizers in an aqueous medium to obtain a mixture. It is possible to add a portion of the milk and/or soy proteins and of the stabilizers in a first step, with the residual portion of the milk and/or soy proteins and of the stabilizers being added and mixed in during or after one of steps a)-d) of the preparation method.

However, it is preferred that all of the milk and/or soy proteins and all of the stabilizers are mixed in step a), so that these components can be homogenized as completely as possible with the aqueous medium in a subsequent step, in order to thus form a stable homogenate. If the drink also contains other constituents, these constituents can likewise be added during step a).

In step b), the pH of the mixture obtained in step a) is set to a pH of 3.5-4.5, preferably from 3.7-4.3, most preferably from 3.9-4.3.

It is important to obtain such a pH in order to obtain a stable drink. Since the pH of milk products is in the neutral range, it is necessary to add an acid in order to lower the pH. Any food acid which is acceptable for use in foods can be used for this acidification of the mixture of constituents, such as for example lactic acid, phosphoric acid, citric acid, gluconic acid, glucono-delta-lactone, ascorbic acid, malic acid, tartaric acid, etc. Fermented milk may also be a source of food acid.

In step c), the mixture with a pH in the range from 3.5-4.5 obtained in step b) is homogenized to obtain a homogenate. The homogenization can be carried out by means of any homogenization method which is known in the specialist field, for example using a valve homogenizer (for example APV), a single-stage or multi-stage homogenizer, a Microfluidizer (Microfluidics, US), an Ultra-turrax (Janke & Kunkel, Germany) or a membrane homogenizer. For example an emulsion is formed if the mixture also comprises fats or oils, and a dispersion is formed if, for example, fat-free products or products based on skimmed milk are used.

In step d), the pH of the homogenate obtained in step c) is set to 5.2-6.5, preferably 5.2-6.2. This results in a stable drink which has a pH which is such that a mildly acidic drink is obtained, making the taste sensation of many flavours extraordinarily pleasant. Any alkali which is acceptable for food use can be used to increase the pH, such as for example NaOH, KOH, $NaHCO_3$, $Ca(OH)_2$, trisodium citrate, or combinations thereof.

Step e) involves mixing in the alcohol and optionally a residual portion of the milk and/or soy proteins and of the stabilizers during or after one or more of steps a)-d). As has already been emphasized above, it is preferred that virtually all of the milk and/or soy proteins and virtually all of the stabilizers are mixed in step a), so that a stable homogenate is obtained during or after step c). The alcohol can be mixed in during any of steps a)-d), but is preferably mixed with the milk and/or soy proteins and the stabilizers in step a).

The drink preferably has a D(3,2) less than 2.0 microns, preferably less than 1.5 microns, more preferably less than 1.2 microns, since this produces a stable drink.

In a preferred embodiment, the drink also comprises one or more fats. These fats may be all fats which are acceptable for food use, such as for example cream, butter fat and vegetable oils/fats, such as coconut oil, MCT oil and soy oil. The person skilled in the art will readily be able to identify suitable oils and/or fats and/or combinations thereof. The fat content is preferably at most 10% by weight, based on the total weight of the constituents. The fats can be added during or after any of steps a)-d), although it is preferred that they are added prior to step c), and more preferably during step a). In that case, they can advantageously be homogenized and incorporated in an emulsion.

It is preferred that the one or more fats are at least partially derived from cream, for reasons listed above. A combination of cream with one or more other fats and/or oils is also possible.

If the drink according to the invention comprises at least one fat other than cream, this fat other than cream is preferably added in step a) in order to obtain the mixture, which mixture is homogenized prior to step b) in order to obtain an emulsion. The pH of this emulsion can advantageously be set in this way. If cream alone is used as source of the one or more fats, this homogenization step prior to step b) can be omitted, since the fat in the cream is already sufficiently well dispersed.

For the same reasons as explained above, the drink also comprises one or more sweeteners.

In an embodiment, the one or more stabilizers are selected from the group consisting of pectin, alkylene glycol alginates, carboxymethyl cellulose, locust bean gum, glycoproteins, modified starch, sucrose esters, carrageenan, guar gum, sodium stearoyl lactylate, xanthan gum, gellan gum and chitosan.

In another preferred embodiment, the one or more stabilizers are selected from the group consisting of pectin, alkylene glycol alginates, such as propylene glycol alginate, carboxymethyl cellulose, locust bean gum and glycoproteins. It has been found that particularly stable drinks are obtained if these stabilizers are used.

It is preferred that the one or more stabilizers comprise at least alkylene glycol alginates, since these stabilizers have a better action in the pH range of around 5.7.

More preferably, the one or more stabilizers at least comprise propylene glycol alginate, since this stabilizer has by far the best action in the pH range in question. The propylene glycol alginate is therefore added in a quantity which is suitable for stabilizing the drink, either alone or together with one or more further stabilizers.

In yet another preferred embodiment, the drink comprises at least 0.5-10% by weight of one or more milk and/or soy proteins, at most 10% by weight of one of more fats, 0.5-40% by volume of alcohol, and 0.05-10 g/L of one or more stabilizers. It has been found that a drink prepared using these constituents had a particularly good taste sensation.

It is preferable for step c) to be carried out at a temperature of at least 40 C, preferably at least 50 C, more preferably at least 60 C, and most preferably at least 70 C, since homogenization at these temperatures gives a better homogenate.

It is also preferable for step c) to be carried out at a pressure of at most 400 bar, preferably at most 300 bar, more preferably at most 250 bar and most preferably at most 200 bar. This produces a particularly suitable homogenate with the correct D (3,2), gives a particularly stable drink.

The invention will now be explained in more detail with reference to a number of examples which, incidentally, are not intended to restrict the invention in any way.

EXAMPLES

Example 1. Mildly Acidic Cream Liqueur with Coffee Flavour

Ingredients for 1 L of liqueur: 122 g of milk, 88 g of cream (42% fat), 3 g of lactic acid, 219 g of sugar, 126 g of alcohol (96%; Nedalco), 4 g of propylene glycol alginate (PGA; Profoam, FMC, the Netherlands), 3 g of coffee flavour AD-48395 (Quest), 5 g of caramel N16 (Belgosuc), 497 g of water.

The milk, cream, a portion of the sugar and PGA were mixed. A portion of the alcohol was added in a 50% by volume solution. Then, lactic acid was added until a pH of 4.0 was reached. The mixture was heated to at least 70 C and then emulsified using a two-stage homogenizer at a pressure of 200/50 bar. Then, the homogenate was cooled back down to a temperature of below 15° C. Then, the pH was adjusted to 5.7 by careful addition of sodium hydroxide solution. Then, the remaining sugar, alcohol, the coffee flavour and the caramel were mixed in.

Example 2. Mildly Acidic Cream Liqueur with Red Fruit Flavour

Ingredients for 1 L of liqueur: 122 g of milk, 88 g of cream, 3 g of lactic acid, 219 g of sugar, 126 g of alcohol 96%, 4 g of PGA, 7 g of red fruit flavour QL-16385 (Quest, the Netherlands), 2 g of Eurogran Ponceau 4R (1% solution; Sensient Food Colors), 500 g of water.

The milk, cream, sugar and stabilizer were mixed. Lactic acid was added until a pH of 4.1 was reached. The mixture was heated to at least 70° C. and then emulsified using a two-stage homogenizer at a pressure of 200/50 bar. Then, the homogenate was cooled back down to a temperature of lower than 15° C. The pH was adjusted to 5.7 by careful addition of sodium hydroxide solution. Then, the alcohol (50% by volume solution), the red fruit flavour and the red colouring Eurogran Ponceau 4R were mixed in.

Example 3. Mildly Acidic Alcoholic Dairy Drink with Coffee Flavour

Ingredients for 1 L of liqueur: 330 g of milk, 37 g of MCT oil (Delios S, Cognis Benelux), 5 g of phosphoric acid (Caldic), 219 g of sugar, 126 g of alcohol 96%, 6 g of pectin (Pectine JMJ, Hercules), 3 g of coffee flavour AD-48395 (Quest, the Netherlands), 5 g of caramel N16 (Belgosuc), 330 g of water.

The milk, MCT oil and sugar were mixed. The mixture was heated to at least 70° C. and then emulsified using a two-stage homogenizer at a pressure of 200/50 bar. Then, the homogenate was cooled back down to a temperature of lower than 15° C. After that, the stabilizer pectin was added, followed by phosphoric acid until a pH of 3.8 was reached. The mixture was heated to at least 70° C. and then emulsified using a two-stage homogenizer at a pressure of 200/50 bar. Once again, the homogenate obtained in this way was cooled back down to a temperature of lower than 15° C. The pH was adjusted to 5.7 by careful addition of sodium hydroxide solution. Then, the alcohol (in a 50% by volume solution) was mixed in together with the coffee flavour and the caramel.

Example 4. Mildly Acidic Alcoholic Dairy Drink (0% Fat) with Red Fruit Flavour Ingredients for 1 L of liqueur: 330 g of skimmed milk, 3 g of lactic acid, 219 g of sugar, 126 g of alcohol 96%, 4 g of PGA, 7 g of red fruit flavour QL-16385, 2 g of Eurogran Ponceau 4R (1% solution), 380 g of water.

The milk, sugar and PGA were mixed. Then, lactic acid was added until a pH of 4.3 was reached. The mixture was heated to at least 70° C. and then subjected to a homogenization treatment using a two-stage homogenizer at a pressure of 200/50 bar. The homogenate was cooled back down to a temperature of lower than 15° C. The pH was adjusted to 5.7 by careful addition of sodium hydroxide solution. The alcohol (in a 50% by volume solution), the red fruit flavour and the red colouring Eurogran Ponceau 4R were mixed in.

Example 5. Stability Tests

A number of alcoholic milk and/or soy protein-based drinks with a pH in the range from 5.2-6 were prepared in various ways. The stability of the drinks was assessed visually for cream separation.

Furthermore, agglomeration was assessed by means of microscopy. It was determined by particle size analysis of the drinks that the D (3,2), after the said storage time, did not deviate substantially from the starting conditions, and was still less than 2 microns.

The following table presents the results. It can be seen from the results that a drink prepared using a method according to the present invention remains stable for a longer period of time.

| Exp. No. | Process pH | Final pH | Stability (weeks) 20° C. |
|---|---|---|---|
| Coffee | 7 | 5.5 | <4 |
| Red Fruits | 7 | 5.5 | <4 |
| Coffee | 4 | 4 | >26 |
| Red Fruits | 4 | 4 | >26 |
| Coffee | 4 | 5 | >26 |
| Red Fruits | 4 | 5 | >26 |

-continued

| Exp. No. | Process pH | Final pH | Stability (weeks) 20° C. |
|---|---|---|---|
| Coffee | 4 | 5.5 | >26 |
| Red Fruits | 4 | 5.5 | >26 |
| Coffee | 4 | 6 | >26 |
| Red Fruits | 4 | 6 | >26 |

Example 6. Taste Tests

A trained panel of three people was requested to compare the flavour of a number of alcoholic milk protein-based drinks. The drinks had all been prepared by the method according to the invention and differed by virtue of a varying final pH of the drink. The findings of the test persons are given in the table below. It can be seen from this table that the drinks with a pH in the range of lower than 5 were described as "very acidic" and "sharply acidic", while the drinks with a pH in the range from 5.2-6.5 were described as "slightly acidic" and "rich".

|  | Person 1 | Person 2 | Person 3 |
|---|---|---|---|
| End product with coffee flavour |  |  |  |
| pH 4.1 | Very acidic, does not suit coffee | Acidic | Very acidic, overwhelming |
| pH 5 | Very acidic, does not suit coffee | Less acidic | Less acidic |
| pH 5.5 | Better flavour, sharp | Richer in flavour | Best flavour |
| pH 6.0 | Best flavour | Richer in flavour | Slightly acidic, rich |
| End product with red fruit flavour |  |  |  |
| pH 4.1 | Very acidic, sharp | Thin and acidic | Really sharply acidic |
| pH 5 | Acidic, sharp | "Acidic character" has disappeared | Slightly acidic, alcohol bite |
| pH 5.5 | Refreshingly acidic | Richer in flavour | Slightly acidic, alcohol bite |
| pH 6.0 | Little alcohol "bite", lacks acid | Richer in flavour | Can no longer be called acidic |

The invention claimed is:

1. A stable alcoholic drink having a pH in the range from 5.2-6.2, comprising (i) at least one or more milk proteins or soy proteins, (ii) alcohol, and (iii) an alkylene glycol alginate, wherein the drink exhibits substantially no agglomeration or segregation when stored at 15-25° C. for 2 months.

2. The drink according to claim 1, which has a volume-surface average particle size distribution D(3,2) of less than 2.0 microns.

3. The drink according to claim 1, wherein the drink is homogenized.

4. The drink according to claim 1, wherein the drink further comprises one or more fats.

5. The drink according to claim 4, wherein the one or more fats are at least partially derived from cream.

6. The drink according to claim 1, wherein the drink further comprises one or more sweeteners.

7. The drink according to claim 1, wherein the alkylene glycol alginate is a propylene glycol alginate.

8. The drink according to claim 1, wherein the drink comprises 0.5-10% by weight of the one or more milk proteins or soy proteins, 0.5-40% by volume of alcohol and 0.05-10 g/L of the alkylene glycol alginate.

9. A method for preparing a stable alcoholic drink having a pH in the range from 5.2-6.2 and comprising at least one or more milk proteins or soy proteins, alcohol and an alkylene glycol alginate, the method comprising the following consecutive steps:
(a) mixing at least a portion of the milk protein or soy protein and at least a portion of the alkylene glycol alginate in an aqueous medium to obtain a mixture;
(b) setting the pH of the mixture to 3.5-4.5;
(c) homogenizing the mixture obtained in step (b) to obtain a homogenate;
(d) setting the pH of the homogenate to 5.2-6.2; and
(e) mixing in alcohol and optionally a residual portion of the milk protein or soy protein and of the alkylene glycol alginate during or after one or more of steps (a)-(d).

10. The method according to claim 9, wherein the drink has a volume-surface average particle size distribution D(3, 2) of less than 2.0 microns.

11. The method according to claim 9, wherein the drink exhibits substantially no agglomeration or segregation when stored at room temperature for at least two months.

12. The method according to claim 9, wherein the drink further comprises one or more fats.

13. The method according to claim 12, wherein in step (a) at least one fat other than cream is added to obtain the mixture, which mixture is homogenized to obtain an emulsion prior to step (b).

14. The method according to claim 9, wherein the drink further comprises one or more sweeteners.

15. The method according to claim 9, wherein the alkylene glycol alginate is a propylene glycol alginate.

16. The method according to claim 9, wherein the drink comprises 0.5-10% by weight of one or more milk proteins or soy proteins, at most 10% by weight of one or more fats, 0.5-40% by volume of alcohol and 0.05-10 g/L of the alkylene glycol alginate.

17. The method according to claim 9, wherein step c) is carried out at a temperature of at least 40° C.

18. The method according to claim 9, wherein step c) is carried out at a temperature of at least 60° C.

19. The method according to claim 9, wherein step c) is carried out at a pressure of at most 400 bar.

20. The drink according to claim 1, having a pH in the range from 5.4-6.0.

21. The drink according to claim 1, comprising at most 10% by weight of fats.

* * * * *